United States Patent

Inoue et al.

[11] Patent Number: 5,819,387
[45] Date of Patent: Oct. 13, 1998

[54] PLUG UNIT AND METHOD OF INSTALLATION THEREOF

[75] Inventors: Akifumi Inoue; Yuzo Ota, both of Hamamatsu, Japan

[73] Assignee: Yamaha Corporation, Japan

[21] Appl. No.: 614,360

[22] Filed: Mar. 12, 1996

[30] Foreign Application Priority Data

Mar. 14, 1995 [JP] Japan .................................... 7-081819

[51] Int. Cl.$^6$ .............................. B23P 17/00; B23P 19/00
[52] U.S. Cl. ................................. 29/423; 29/426.6; 29/451
[58] Field of Search .................................. 29/221.5, 451, 29/450, 890.149, 282, 235, 423, 426.1, 426.6

[56] References Cited

U.S. PATENT DOCUMENTS

| | | | |
|---|---|---|---|
| 2,095,931 | 10/1937 | Kraft | 29/450 |
| 2,558,589 | 6/1951 | Skolfield | 29/450 |
| 2,849,201 | 8/1958 | Schelgunov | 29/450 |
| 2,991,819 | 7/1961 | Lee | 29/450 |
| 3,387,354 | 6/1968 | Mossberg | 29/221.5 |
| 3,831,240 | 8/1974 | Boggs et al. | 29/450 |
| 4,765,048 | 8/1988 | Hokanson | 29/221.5 |

FOREIGN PATENT DOCUMENTS 6171330   6/1994   Japan .

*Primary Examiner*—David P. Bryant
*Assistant Examiner*—Tisa Stewart
*Attorney, Agent, or Firm*—Ostrolenk, Faber, Gerb & Soffen, LLP

[57] ABSTRACT

A reusable plug device for providing sealing of an opening of a rim of a wheel for leak testing has a simple structure and facilitates installation/removal of the plug device using a simple insertion tool and a removal tool. The plug body has an axially extending cavity for receiving the insertion tool to enable the plug body to be inserted until a flange section of the plug body abuts the surface of the workpiece. The flange section serves as a stopper to indicate the stop position and ensures a uniform installation of the plug device in each workpiece. For removal of the plug body, the removal tool is inserted into the cavity and the removal tool is pushed in the insertion direction, so that the plug body and the flange section both collapse inward into the cavity to enable the plug device to be simply pushed out through the opening section.

3 Claims, 5 Drawing Sheets

५,८१९,३८७

PLUG UNIT AND METHOD OF INSTALLATION THEREOF

BACKGROUND OF THE INVENTION

1. Field of the Invention

The present invention relates in general to plugs and a method of installing and removing a plug device, and relates in particular to removable plug device which forms a seal when fitted in an opening.

2. Description of the Related Art

A rim of an automobile wheel is provided with an opening for attaching an air valve. For use in tubeless tires, this type of rim must be tested for leaks by plugging the opening with a plugging device, as a part of the process of manufacturing the rim.

In performing such a test, a plug device such as the one shown in FIGS. 9A and 9B, for example, is used. The plug device 30 is made of a solid cylindrical plug body 31 having a tapered surface 31A at its leading tip end and a seal section 31B formed around the outer periphery, and a flange section 32 at the tail end of the plug body 31, which is at the opposite end to the direction of insertion of the plug device 30. The plug device 30 is made of a rubber material, and when the plug device 30 is inserted into the opening section 33 of a workpiece W, the sealing action is provided by the sealing section 31B fitting tightly the opening section 31.

To insert the plug device 30 into the opening section 33, the tapered surface 31A of the plug body 31 is first manually inserted into the opening section 33, and using a rod-shaped jig 34 abutting against the flange section 32, the plug device 30 is pushed in the direction of the arrow shown in the drawing into the hole section 33. When the plug device 30 is to be removed, the flange section 32 is clamped with a suitable tool and is pulled in the opposite direction to the insertion direction.

However, the conventional plug device such as the plug device 30 shows a tendency to form a local bulge region 31C in the seal section 31B of the plug body 31, as illustrated in FIG. 9A. This is because the material is made of rubber to effect sealing and because the plug device 30 is formed as a solid member, and also because the outer diameter of the plug body is slightly larger than the opening section 33 so as to provide a pressure fit. The result is that because of the generation of the bulge region 31C, it is difficult to insert the plug device 30 to the full depth so that the flange section 32 fits flush with the workpiece W, as illustrated in FIG. 9B.

Furthermore, as illustrated in FIG. 9B, when the plug device 30 is fully inserted into the opening section 33, the diameter of the solid flange section 32 is larger than the diameter of the opening section, so the plug device 30 cannot be removed by further forcing the plug device 30 in the insertion direction. Therefore, removal of the conventional plug device is always carried out by grasping the flange section 32 and pulling out the plug device 30 in the direction opposite to the insertion direction. However, because the plug device 30 is elastic and the outer periphery of the flange section expands to present a round profile as illustrated in FIG. 9B, it is not always easy to grip the flange section 32 sufficiently tightly for quick removal.

The process of pulling out the plug device 30 is far more laborious compared with the process of insertion of the plug device 30, and coupled with the difficulty of installation, the problem has been the expectation that a simple and quick method of installation/removal does not exist. Additionally, if the flange section 32 is damaged during the gripping step, the plug device 30 can no longer be reused, and it presented another problem that the plug device is uneconomic.

SUMMARY OF THE INVENTION

It is an object of the present invention to provide a plug device having an extremely simple structure to enable effortless and quick installation/removal of the plug device. A further object of the present invention is to provide a method for installation/removal of the plug device of the present invention.

The first objective is achieved in a plug device, to be inserted into an opening section of a workpiece to provide an external and internal sealing of the workpiece, comprising: a plug body having a sealing section for insertion into the opening section of the workpiece; a stopper section disposed on a tail end of the plug body for defining an insertion position of the plug device; and a cavity extending from an open end of the cavity to part way towards a leading end of the plug body, and ending at a bottom surface of the cavity.

A modified construction of the plug device comprises: a cylindrical plug body having a sealing section for insertion into the opening section of a workpiece; a stopper section disposed on a tail end of the plug body for defining an insertion position of the plug device; and a cavity extending from an open end of the cavity to part way towards a leading end of the plug body, and ending at a bottom surface of the cavity, wherein the plug body and the stopper section are formed so as to allow the stopper section to collapse into the opening section by deforming radially inward.

The second object to develop a method for installing or removing the plug device simply and quickly is achieved in a method comprising the steps of: inserting a first jig into the cavity of the plug devices described above, and pressing the first insertion jig against the bottom surface of the cavity so as to insert the plug device into the opening section until a specific position for installation of the plug device is reached; and inserting a second jig for removal of the plug device into the cavity against the bottom surface of the cavity so as to detach the plug device from the opening section, wherein the first jig is formed so as not to allow inward radial deformation of the stopper section and the second jig is formed so as to allow inward radial deformation of the stopper section.

PREFERRED EMBODIMENTS OF THE INVENTION

Figure 1:
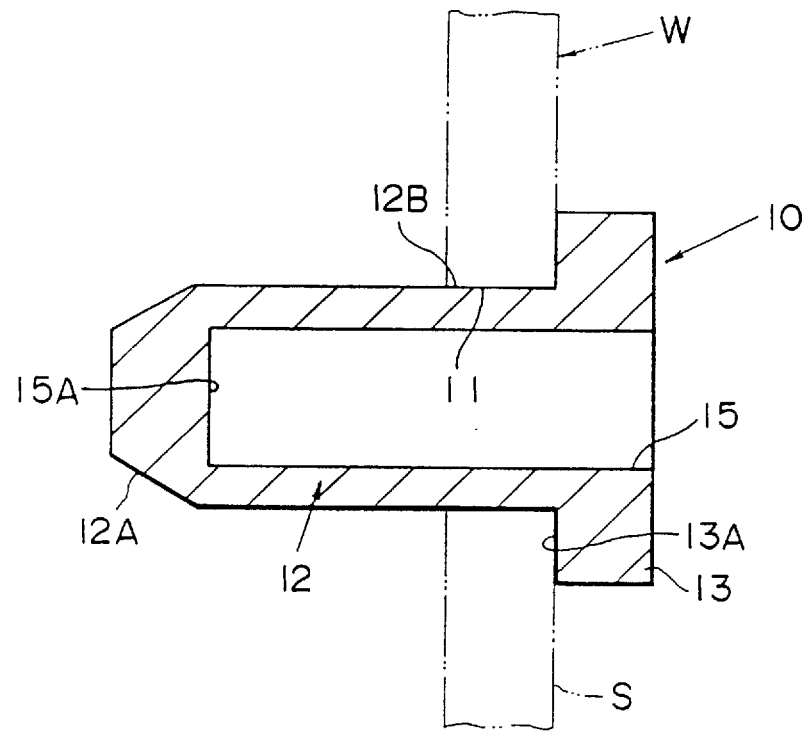
FIG. 1 is a cross sectional view of a plug device of the present invention installed in an opening section of a workpiece.
Figure 2:
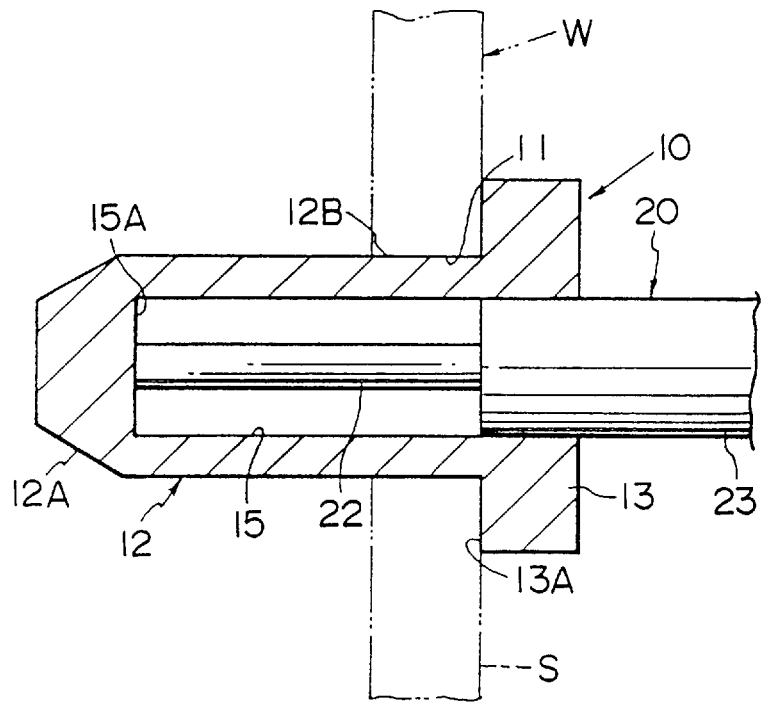
FIG. 2 is a cross sectional view of the plug device installed into the opening section of a workpiece with a first jig for installation of the plug device.
Figure 3:
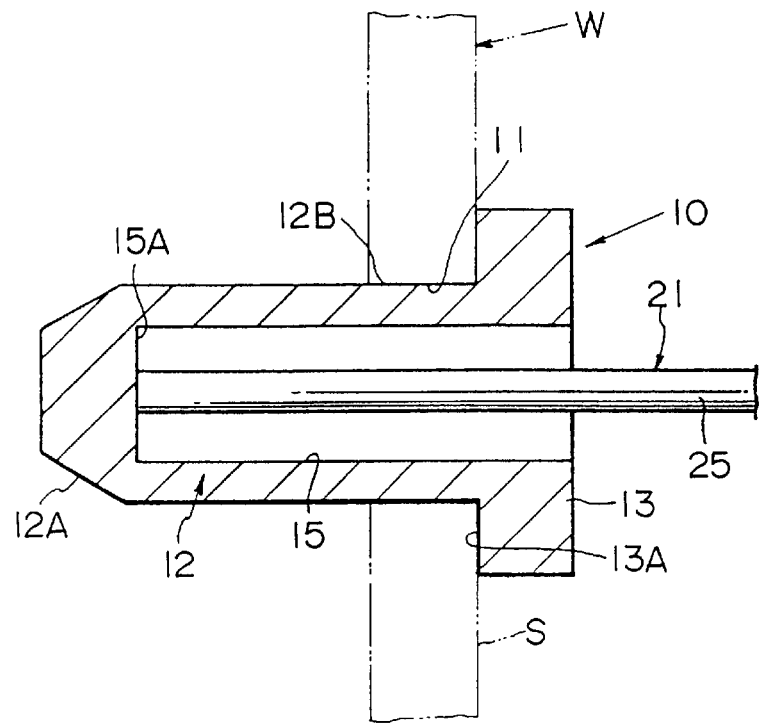
FIG. 3 is a cross sectional view of an initial stage of plug removal using a second jig for removal of the plug device.

In the following, a first embodiment of the plug device will be explained with reference to the drawings. A cross sectional view of the plug is shown in FIG. 1, and the process of installation/removal is illustrated in FIGS. 2 and 3. The plug device 10 is installed in an opening section 11 of a rim (being referred to as a workpiece W) for accepting an air valve in a finished tubeless tire.

The plug device 10 is made of an elastically deformable material such as rubber, and comprises: a plug body 12 having a cylindrical shape; and a flange section 13, acting as a stopper, disposed near a tail end of the plug body 12 shown at the extreme right in the illustration. A tapered surface 12A is provided at the leading end of the plug body 12 and is contiguous with the outer surface of the plug body 12 which formed to serve as a sealing section 12B. The outer diameter of the plug body 12 is made slightly larger than the inner diameter of the opening section 11 so that the plug device 10 will be a pressure fit in the opening section 11.

The size of the flange section 13 is chosen so that the leading flange surface 13A is able to abut the surface S of the workpiece W to define the position of the plug body 12 when it is fully inserted in contact with the surface S of the workpiece W.

The plug body 12 is a hollow body having a central cavity 15 which extends, approximately parallel to the plug axis, from the open end of the flange 13 to part way towards the tip end of the plug body 12, and has a flat-bottomed surface 15A, The cavity 15 does not pass through the tip end of the plug body 12 but stops a short distance away from the tip end. Therefore, when the sealing section 12B is subjected to a radial inwardly-directed external force, the plug body 12 and the flange section 13 are able to elastically collapse into the cavity 15. The length of the cavity 15 needs to be at least in excess of the thickness of the flange section 13. In other words, the cavity 15 is sufficiently deeper than an area which is subjected to the force from the workpiece w at the insertion of the plug body 12.

The process of installation/removal of the plug device 10 is carried out with the use of a first jig 20 for installation and a second jig 21 for removal as illustrated, respectively, in FIGS. 2 and 3. As shown in FIG. 2, the first jig 20 comprises a small-diameter rod 22 and a large-diameter rod 23 formed integrally with the small-diameter rod 22. The outer diameter of the small-diameter rod 22 is smaller than the inner diameter of the cavity 15, and the overall length of the first jig 20 is such that when the bottom end of the small-diameter rod 22 touches the bottom surface 15A of the cavity 15, the outer periphery of the large-diameter rod 23 is positioned opposite to the flange section 13.

The outer diameter of the large-diameter rod 23 is about the same as the inner diameter of the cavity 15, or slightly smaller, thus prohibiting the flange section 13 to deform inwardly.

As shown in FIG. 3, the second jig 21 is a straight rod 25 of a constant small diameter along its axis. The outer diameter of the straight rod 25 is about the same as that of the small-diameter rod 22 of the first jig 20.

Next, the process of installation/removal of the plug device 10 will be explained with reference to FIGS. 2 to 6.

Figure 6:
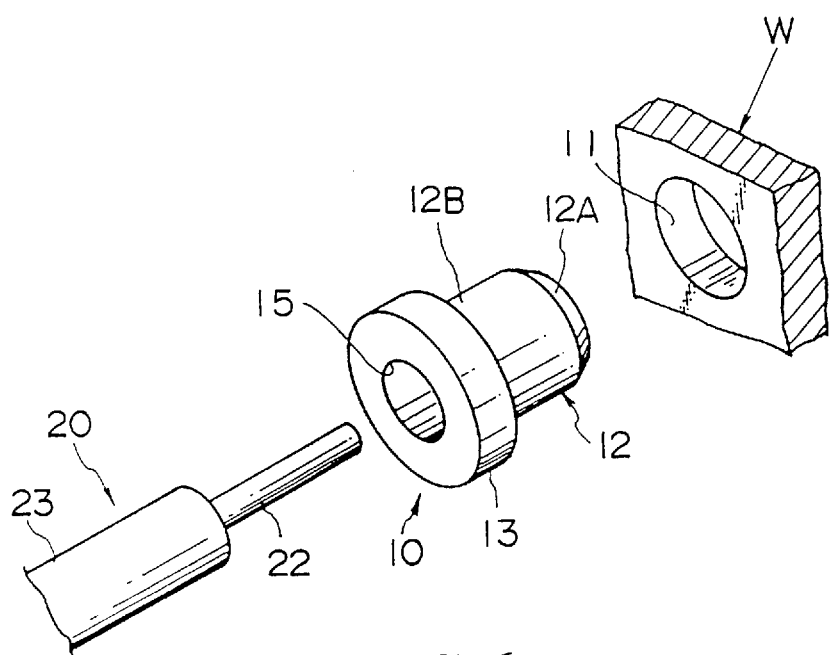
FIG. 6 is a perspective view of the workpiece, the plug device, and the first jig.

First, as shown in FIG. 6, the plug device 10 is oriented so that the tapered surface 12A faces the opening section 11 of the workpiece W, and the first jig 20 is inserted into the cavity 15 through the open end of the flange section 13 until the bottom end of the small-diameter rod 22 abuts the bottom surface 15A, and the first jig 20 is used to push the plug device 10 into the opening section 11 of the workpiece W.

In this condition, the plug body 12 is pressure fit inside the opening section 11, and sliding of the sealing section 12B of the plug body 12 against the inside surface of the opening section 11 causes a large friction force. At this stage of installation, there is a mutual interaction between the pushing force acting on the bottom surface 15A of the cavity 15 by the first jig 20 and the holding force generated by the friction at the interface of the sealing section 12B. The result is that the plug body 12 is subjected to a tensile force in the axial direction. Because the plug body 12 is made of an elastic material, the axial tensile force causes a radial contraction (collapse) at the sealing section 12A of the diameter of the plug body 12. Because a space is provided between the inside surface of the cavity 15 and the small-diameter rod 22 of the first jig 20, the plug body 12 can be deformed inwardly. The result is that the sealing section 12B deforms elastically inwardly in the radial direction and the process of insertion is facilitated by a reduction in the frictional force at the interface between the sealing section 12B and the inside surface of the opening section 11.

In the meantime, as shown in FIG. 2, the radial inward deformation of the flange section 13 is restricted due to the presence of the large-diameter rod 23 of the first jig 20. When the flange surface 13A abuts the surface S of the workpiece W, further insertion is physically restrained, thus indicating the completion of insertion step, and the process of installation is completed.

Figure 4:
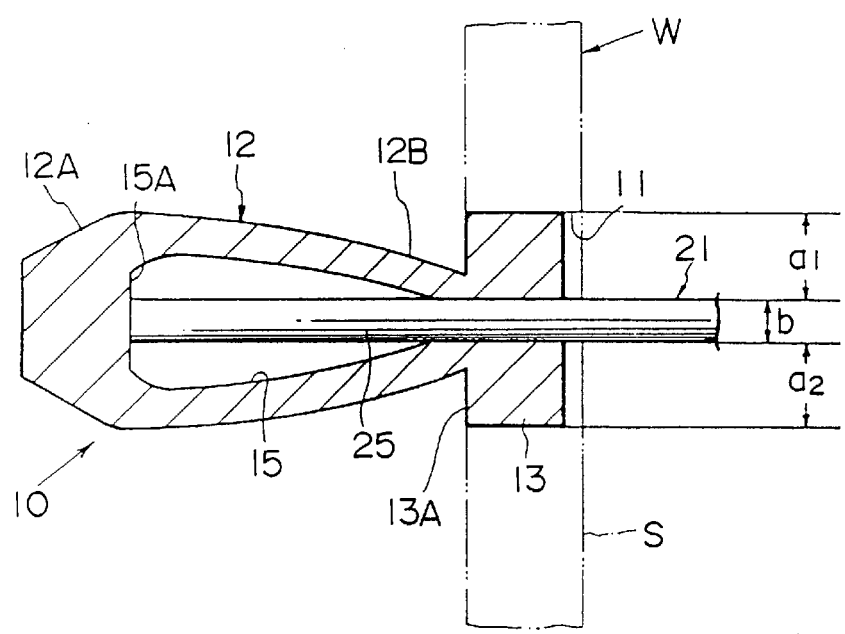
FIG. 4 is a cross sectional view of a collapsed plug device during the removal process of the plug device.
Figure 5:
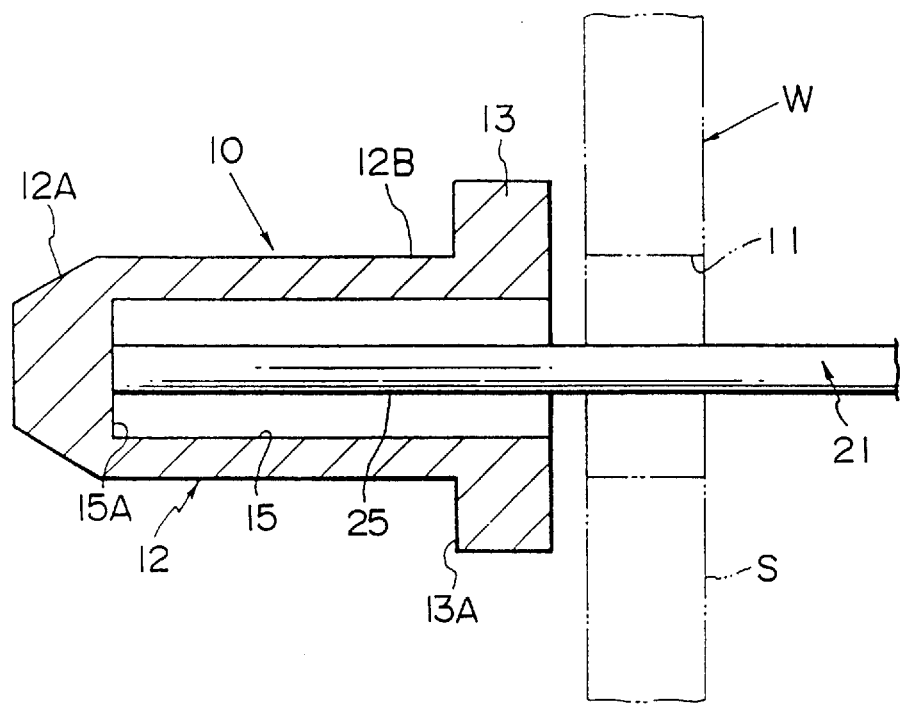
FIG. 5 is a cross sectional view of the workpiece after the plug device has dropped out of the opening section.

For removal of the plug device 10, the second jig 21 is used, as illustrated in FIGS. 3 to 5. When the bottom end of the straight rod 25 of the second jig 21 is pushed against the bottom surface 15A of the cavity 15, because of the holding action of the friction force acting on the interface between the sealing section 12B and the inside surface of the opening section 11, the entire plug device 10 experiences a tensile force applied in the axial direction. The plug device 10 under the elastic action of the tensile force tries to contract in the radial direction, and because the second jig 21 provides a space to allow such a radial collapsing to take place, the inward radial force can be accommodated, and the overall plug body 12 including the sealing section 12B and the flange section 13 collapse into the opening section 11 by deforming radially inwardly. The result is that the flange section 13 collapses into the opening section 11, as illustrated in FIG. 4. Upon further application of the pushing force, the plug device 10 itself slides out of the workpiece W, as illustrated in FIG. 5. The removed plug devices 10 are collected to be reused after the completion of leak test and the like.

For the flange section 13 to slide through the opening section 11 smoothly, it is preferable that the sum of the radii a1, a2 of the flange section 13 and the radius b of the straight rod 25 is the same as or slightly smaller than the inner diameter of the opening section 11.

According to the first embodiment, because a cavity 15 is provided approximately centrally and parallel to the axial direction of the plug body 12 and the flange section 13, the installation process of the plug device 10 is facilitated by the tensile force generated by a combined effect of the pushing force of the first jig 20 abutting against the bottom surface 15A and the friction force acting on the sealing section 12B. The result is that the overall plug body undergoes an inward radial deformation, thereby avoiding the formation of a bulge at the sealing section 12B as in the conventional plug device, thus permitting the plug device 10 to be inserted smoothly into the opening section 11.

Further, because the plug body 12 is constructed so that the flange section 13 which acts as a stopper is integrally formed with the plug body 12 and the large-diameter rod 23 of the first jig 20 physically prevents the inward deformation of the flange section, when the flange section 13 abuts the surface S of the workpiece W, further insertion of the plug body 12 is prevented. Therefore, the design of the plug device 10 not only provides a positive indication of the end of the installation process, but also ensures that the plug device 10 is always installed in the same position.

For removal of the plug device 10 using the second jig 21, as described above, the plug device 10 can be slid out of the opening section 11 by pushing the plug device 10 in the same direction of insertion, because the second jig 21 is constructed so that the flange section 13 is able to contract inwardly and towards the open end. This method of removal is very much simpler and quicker than the conventional method, and can be easily automated. Further advantage is that because there is no need to grip any part of the plug device 10 for removal purposes, there is no danger of damaging the plug device 10, and the reusability is increased significantly.

Figure 7:
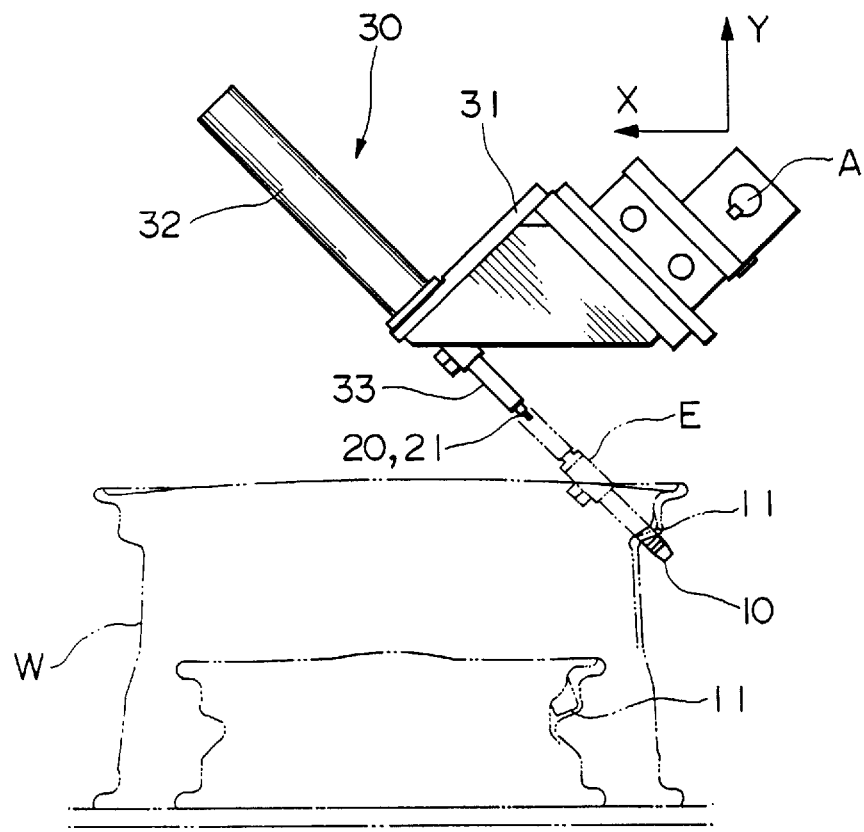
FIG. 7 is a schematic illustration of a plug machine for use in installation/removal of the plug device of the present invention.

For installation/removal of the plug device 10, a plug machine 30 such as the one shown in FIG. 7 can be used to automatically install/remove the plug device 10 on many workpieces W on a continuous basis. The plug machine 30 comprises: a base 31 which is freely movable in the X- and Y- directions as well as freely rotatable about an axis A; a power cylinder 32 freely extendably disposed on the base 31; and a chuck device 33 for holding either the first jig 20 or the secondjig 21 disposed on a tip end of the power cylinder 32. For installation/removal of the plug device 10, the power cylinder 32 is aimed at the opening section 11 of a workpiece W disposed at a specific location. The power cylinder 32 is extended, as indicated in E in FIG. 7, so as to insert a jig 20 or 21 disposed at the tip end of the power cylinder 32 into the cavity 15 of the plug device 10 to either install or remove the plug device 10 in/from the opening section 11 of the workpiece W. By repeating this step for other workpieces W, it is possible to install/remove the plug device 10 automatically on many workpieces W on a continuous basis.

For automatically installation/removal of the plug device 10, the plug device 10 must be supplied to the firstjig 20 continuously, and also be kept at a top portion of the jig 20 by aspiration e.g. However, these steps are not included in the present invention, therefore the further description will be omitted.

Figure 8:
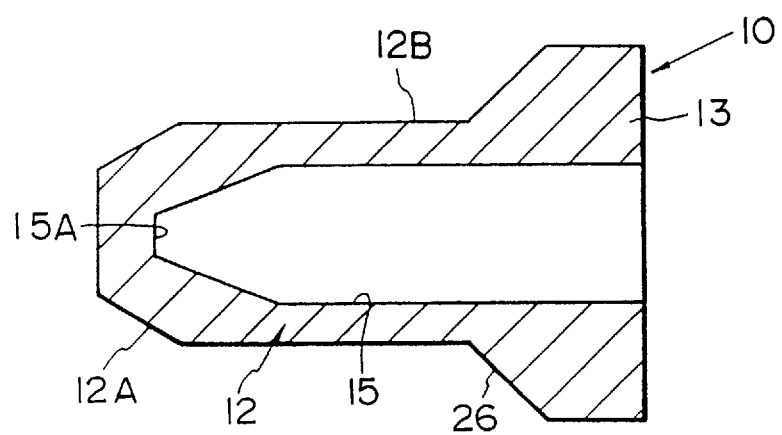
FIG. 8 is a cross sectional view of a modification of the plug device of the present invention.
Figures 9A, 9B:
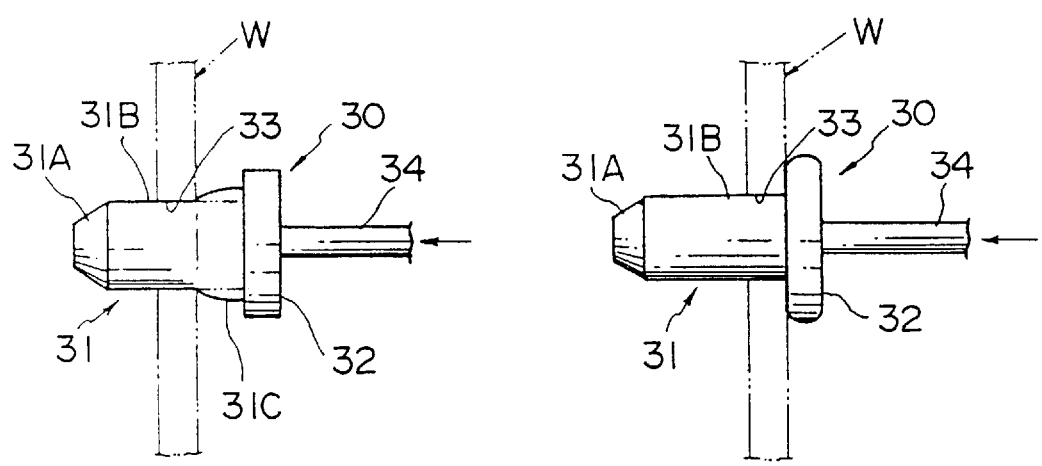
FIG. 9A is a cross sectional view of a partly installed conventional plug device.
FIG. 9B is a cross sectional view of a conventional plug device after the completion of installation.

The plug device 10 of the present invention is not limited to the structure presented above, and other structures, for example, the one shown in FIG. 8 may be utilized. The plug device 10 in this case is provided with a tapered surface 26 between the plug body 12 and the flange section 13. An advantage of this structure is that, the flange section 13 can be pushed into the opening section 11 easily for removal of the plug device 10 to further reduce the friction accompanying the removal process.

There is no particular restriction to the length of the plug body 12, so long as the length is sufficient to provide a durable cavity 15 and a press fit in the opening section 11. So long as a modified plug device is compatible with the first and second jigs 20, 21, various shapes and designs can be adopted. For example, the shape of the plug body 12 may not necessarily be cylindrical, a polygonal shape may be adopted, for example, depending on its application.

As shown in FIG. 8, a tapered section 12A, or a semi-spherical section, may be provided near the bottom surface 15A of the cavity 15. By so doing, an advantage is gained that during the insertion process of the plug device 10, it is assured that the jig 20 or 21 is guided towards the center of the bottom surface 15A of the cavity 15.

Also, the plug devices presented above featured a flange section serving as a stopper, but various other designs of the stopper may be adopted so long as the plug body 12 can be installed in a specified position. For example, the stopping position may be defined by a series of engaging pieces radiating from the periphery of the tail end of the plug body 12 to come into contact with the surface S of the workpiece W to define the stopping position of the plug body 12.

The embodiments of the plug device 10 presented are designed for particular use in leak testing of wheel rim, but if an application does not demand a sealing function but is intended for a simple capping use, for example, then other types of materials such as resins or metals can be used to make the plug device. In such a case, axially extending slits may be provided on the plug body so as to exhibit the same collapsing effect as the embodiments presented, thus enabling the plug device to be removed by pressing in the direction of insertion.

What is claimed is:

1. A method for installation of a plug device to provide an external and internal sealing of a workpiece by fitting the plug device into an opening section of the workpiece, and for removal of a plug device to remove said external and internal sealing of said workpiece by removing said installed plug device from said opening section, the method comprising the steps of:

inserting a first jig into a cavity of said plug device until said first jig presses against the bottom surface of said cavity, and inserting said plug device into said opening section until a stopper section, which is disposed on a tail end of said plug device and is able to elastically collapse into said cavity, abuts a surface of said workpiece, wherein said first jig is shaped and sized so as not to allow inward radial deformation of said stopper section; and inserting a second jig for removal of said plug device into said cavity of said plug device and against the bottom surface of said cavity to cause said stopper section to elastically collapse into said cavity, and pushing said plug device through said opening section so as to detach said plug device from opening section, wherein said second jig is shaped and sized to allow inward radial deformation of said stopper section.

2. A method for installation of a plug device, to provide an external and internal sealing of a workpiece, by fitting the plug device into an opening section of the workpiece, the method comprising the steps of:

inserting a jig into a cavity of said plug device until said jig presses against the bottom surface of said cavity, and, inserting said plug device into said opening section until a stopper section, which is disposed on a tail end of said plug device and is able to elastically collapse into said cavity, abuts a surface of said workpiece;

wherein said jig is shaped and sized so as not to allow inward radial deformation of said stopper section.

3. A method for removal of a plug device to remove an external and internal sealing of a workpiece by removing an installed plug device from an opening section of the workpiece, the method comprising the steps of:

inserting a jig for removal of said plug device into a cavity of said plug device and against the bottom surface of said cavity to cause a stopper section, which is disposed on a tail end of said plug device and which is capable of radially inward elastic deformation, to elastically collapse into said cavity, and pushing said plug device through said opening section so as to detach said plug device from said opening section;

wherein said jig is shaped and sized to allow inward radial deformation of said stopper section.

* * * * *